UNITED STATES PATENT OFFICE.

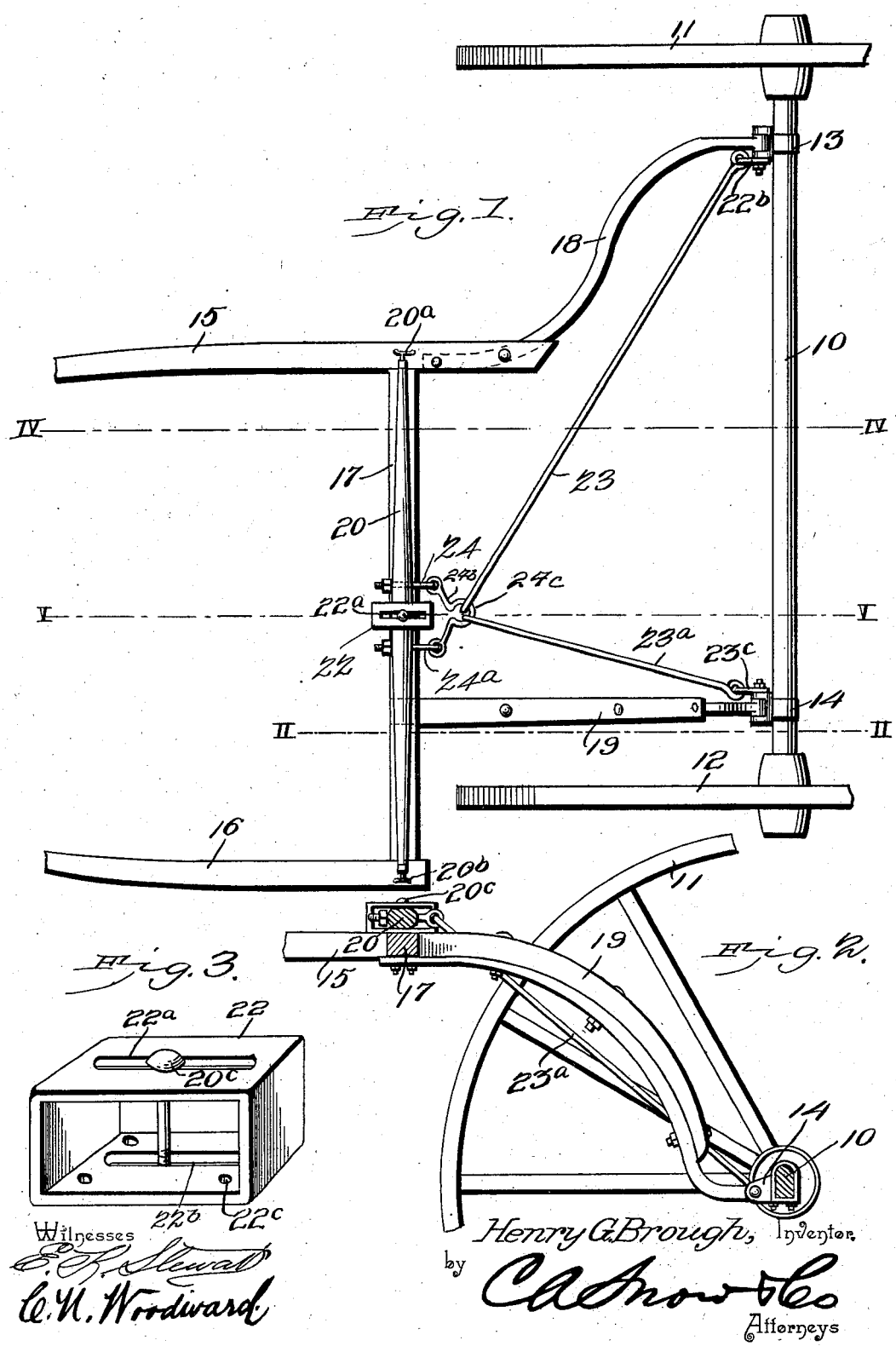

HENRY G. BROUGH, OF LELAND, IOWA.

VEHICLE-THILL.

SPECIFICATION forming part of Letters Patent No. 701,994, dated June 10, 1902.

Application filed April 29, 1902. Serial No. 105,184. (No model.)

*To all whom it may concern:*

Be it known that I, HENRY G. BROUGH, a citizen of the United States, residing at Leland, in the county of Winnebago and State of Iowa, have invented a new and useful Vehicle-Thill, of which the following is a specification.

This invention refers to that class of vehicles wherein the horse travels at one side of the center or in one of the ruts formed by the wheels of the vehicle; and the invention consists in a device whereby the side draft is eliminated and the strains equalized, all as hereinafter shown and described, and specified in the claims.

In the drawings illustrative of the invention, Figure 1 is a plan view of a portion of the running-gear and thills of a vehicle with the improvement attached thereto. Fig. 2 is a longitudinal section on the line II of Fig. 1. Fig. 3 is an enlarged perspective view of the whiffletree-bearing detached.

The device is applicable to any buggy or single carriage without any changes being made in the vehicle, and in the drawings the forward axle is represented at 10, with the wheel at 11 and 12 and the thill-couplings at 13 14 of the ordinary construction.

The side members of the thills are illustrated at 15 16 and the rear cross-bar at 17 of the ordinary construction.

The center line of the travel of the vehicle is indicated by the dotted line IV IV in Fig. 1, and the line of travel of the horse is indicated by the dotted line V V in the same figure, the thills being set to one side of the center in the ordinary manner of this class of vehicles, wherein provision is made for the horse to travel in the ruts or tracks formed by the left-hand wheels.

At the right side the thills are connected to the coupling 13 by a coupling-bar 18 and at the left by a coupling-bar 19, the former preferably leading from the thill member 15 and the latter from the transverse bar 17, as shown. The whiffletree is represented at 20 and is of the usual form, with the trace-hooks 20ᵃ 20ᵇ at the ends. Attached centrally to the cross-bar 17 is a sleeve or bearing 22, through which the whiffletree passes, the sleeve being provided with longitudinal slots 22ᵃ 22ᵇ, engaging the central pivot-pin 20ᶜ of the whiffletree, so that the latter may move horizontally of the vehicle independently of the cross-bar 17 and other parts. The sleeve 22 will be rigidly connected to the cross-bar 17, as by bolts engaging holes 22ᵉ or other suitable fastening.

Connected to the whiffletree 20 on each side of the bearing 22 are two eyebolts 24 24ᵃ, and coupled to these eyebolts is a link 24ᵇ, having a central loop 24ᶜ, and coupled to this loop are two rods 23 23ᵃ, the rod 23 leading to the coupling 13 and connected flexibly thereto, as by a clip 22ᵇ, and the rod 23ᵃ leading to the coupling 14 and connected flexibly thereto, as by a clip 23ᶜ, as shown. By this means the whiffletree is connected flexibly to the axle at the center of the whiffletree and insures the whiffletree from oscillations when the draft is unequal from each of the two rods 23 23ᵃ. By this means also the whiffletree will be connected flexibly to the axle, and thereby have a movement independent of the thills. By this means the draft of the vehicle will be constantly along the line indicated by the dotted line IV IV, while the horse will travel along the line indicated by dotted line V V, the result being that the lines of force along the draft-rods 23 23ᵃ will bring the center line of draft of the vehicle along the line IV IV, whereby all side draft is entirely eliminated and all the strains equalized, and the coaction of the thills and the horse will be the same as in the orinary vehicle having the thills centrally disposed thereon. By this simple means the objectionable side draft which occurs in the ordinary side-draft thills is entirely eliminated and all danger of any sudden side movement of the thills against the horse, caused by the vehicle engaging obstructions, prevented.

In the operation of the device herein illustrated any side movement is effectually resisted by the rods and absorbed by the yieldable flexible connections and is not therefore communicated to the horse through the thills.

The function of the thills in this improved structure is therefore merely to enable the horse to guide the vehicle, while the draft strains are borne entirely by the whiffletree 20 and rods 23 23ᵃ independently of the thills.

The construction is very simple, cheap, and easily applied to any vehicle having the usual thill-couplings 13 and 14 and will not therefore require a specially-constructed vehicle.

The connecting parts may be readily varied to suit any size or style of vehicle and to adapt the device thereto, and the proportions and minor details may be modified and changed without departing from the principle or sacrificing any of the advantages of the invention.

Having thus described my invention, what I claim is—

1. A vehicle-thill connection comprising the thills coupled to the axle at one side of the center line of the vehicle, a whiffletree movably connected to said thills, and draft-rods connecting said whiffletree to said axle at equidistant points on opposite sides of said center line, substantially as described.

2. A vehicle-thill connection comprising the axle having thill-couplings disposed thereon at equidistant points on opposite sides of the center, the thills disposed at one side of the center line of the vehicle, means for connecting said thills flexibly to said thill-couplings, a whiffletree movably connected to said thills, and draft-rods flexibly connecting said whiffletree to said thill-couplings, substantially as described.

3. In a vehicle-thill connection, the thills connected to the vehicle at one side of the center, a whiffletree-bearing connected centrally to said whiffle-thills, a whiffletree movably connected in said bearing, draft-rods flexibly connected to said whiffletree and engaging said vehicle at equidistant points on opposite sides of its center, substantially as described.

4. In a vehicle-thill connection, the thills connected to the vehicle at one side of the center, a whiffletree-bearing having longitudinal slots and connected centrally to said thills, a whiffletree engaging said bearing and having a pivot-pin loosely engaging said slots, draft-rods connected flexibly to said whiffletree and engaging said vehicle at equidistant points on opposite sides of its center, substantially as described.

In testimony that I claim the foregoing as my own I have hereto affixed my signature in the presence of two witnesses.

HENRY G. BROUGH.

Witnesses:
W. A. CROSBY,
E. W. GASTIN.